Dec. 2, 1969   R. F. BONALLACK ET AL   3,481,642
INSULATED BODIES FOR COMMERCIAL VEHICLES
Filed June 14, 1967

INVENTORS
Richard Frank Bonallack
Henry Bills
BY
Hane and Nydick
ATTORNEYS

United States Patent Office 3,481,642
Patented Dec. 2, 1969

3,481,642
INSULATED BODIES FOR COMMERCIAL VEHICLES
Richard F. Bonallack, Thorpe Bay, and Henry Bills, Norwich, England, assignors to Bonallack & Sons Limited
Filed June 14, 1967, Ser. No. 645,989
Claims priority, application Great Britain, June 17, 1966, 27,115/66
Int. Cl. B62d *29/04, 31/00*
U.S. Cl. 296—31                                   11 Claims

ABSTRACT OF THE DISCLOSURE

The invention provides a heat insulated body for commercial vehicles, the body comprising spaced vertical pillars each consisting of inner and outer frame elements with heat insulating material of high compression strength (such as expanded PVC) between them and bonded to them, and inner and outer wall panelling fixed between said vertical pillars and having heat insulating material (such as polyurethane) between said wall panelling, the bonding of high compression insulating material to the inner and outer frame elements eliminating any metal to metal contact between said inner and outer frame element and wall panelling thereby affording maximum heat insulating qualities and thermal efficiency.

---

This invention relates to heat insulated bodies for commercial vehicles.

It is to be understood that the term "vehicle body" used herein is intended to include not only a body forming a permanent part of a vehicle, but also a body which is adapted to be removably supported on a vehicle chassis, that is a container which although designed to form part of, for example, a road vehicle is capable of being transferred from such vehicle to, for example, a rail or sea-going vehicle.

Commercial vehicles provided with permanent or removable heat insulated bodies are used extensively for the transportation of, for example, frozen foodstuffs and other commodities which have to be kept at low temperature during transportation.

The construction of a heat insulated vehicle body of the kind in which the body comprises a light alloy frame structure provided with inner and outer walls has hitherto presented considerable problems, the main one being to avoid metal contact between the frame members which support said walls. One method of overcoming this problem is to provide inner and outer light alloy frame members to join said frame members together with a material which has heat insulating properties and which has a similar strength to metal alloy. This method however has the serious disadvantage that the fitting of the heat insulating material between the inner and outer frame members and around irregular shaped frame elements is laborious and time consuming and consequently costly. In an attempt to overcome this disadvantage it has been proposed to inject or spray a plastic insulating material around and between the frame members. With this method however, it has been found that the insulating material does not always expand into and fill the spaces between complicated shaped frame elements due to the formation of air pockets, and consequently the insulating qualities and thermal efficiency of the vehicle body are impaired.

The main object of the present invention is to overcome this disadvantage and to provide a new and improved method of constructing a heat insulated body which not only facilitates construction but considerably improves heat insulating efficiency.

With this object in view the vehicle body comprises a frame structure supporting heat insulating side walls, end walls, a roof and a flooring, wherein the frame structure forms part of the side and end walls and comprises a plurality of spaced vertical pillars each formed from inner and outer frame elements of light alloy with a heat insulating material of high compression strength between said frame element and bonded thereto, and wherein the side walls comprise inner and outer wall panellings of relatively thin sheet material fitted between said vertical pillars with the space between said inner and outer wall panellings being filled with heat insulating material.

In order that the invention may be more clearly understood one particular embodiment of heat insulated vehicle body according to the invention will now be described, by way of example, with reference to the accompanying drawings in which.

Figure 2:
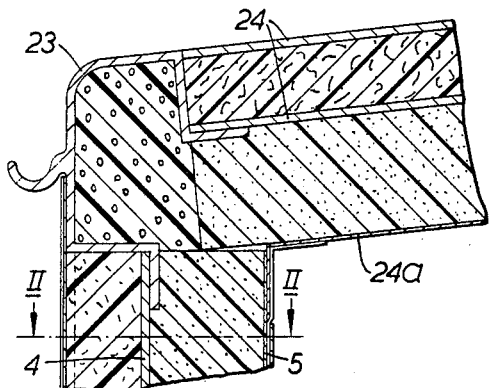
FIGURE 2 is a section on the line II–II of FIGURE 1.
Figure 2:
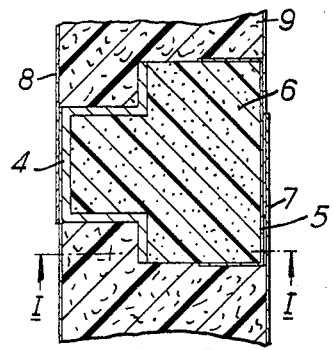

Referring to these drawings the side walls of the body consist of a frame structure comprising a plurality of spaced vertical pillars each comprising an outer light alloy frame element 4 of top-hat section and an inner frame element 5 of channel section also composed of light alloy with a filling 6 of high compression heat insulating material such as expanded polyvinyl chloride now commonly known as PVC, the frame elements 4 and 5 and the expanded PVC or other filling being bonded together with an epoxy resin adhesive. Between the pillars thus formed the side wall of the vehicle is provided with inner and outer wall panelling or covering 7 and 8 respectively of relatively thin sheet metal or other suitable material such as plastic sheeting. The space between the wall panelling or covering 7 and 8 is filled with heat insulating material 9, such as polyurethane, in slab form.

The top hat section element 4 of the pillars form the main supporting framework of the body and these elements are fixed directly to main channel section side beams 10 which cap the ends of the cross bearers 11 mounted on the chassis of the vehicle. Above the cross bearers 11 is laid a skin of aluminum alloy or marine quality resin-bonded plywood 12 and on this skin 12 is laid a suitable thickness of heat insulating material 13, such as expanded PVC, to provide the heat insulation to the vehicle floor. On the layer 13 of expanded PVC or other material is a further skin of marine quality plywood or soft wood boarding 14. The flooring of the vehicle is also preferably covered with an aluminum alloy tray 15.

Figure 1:
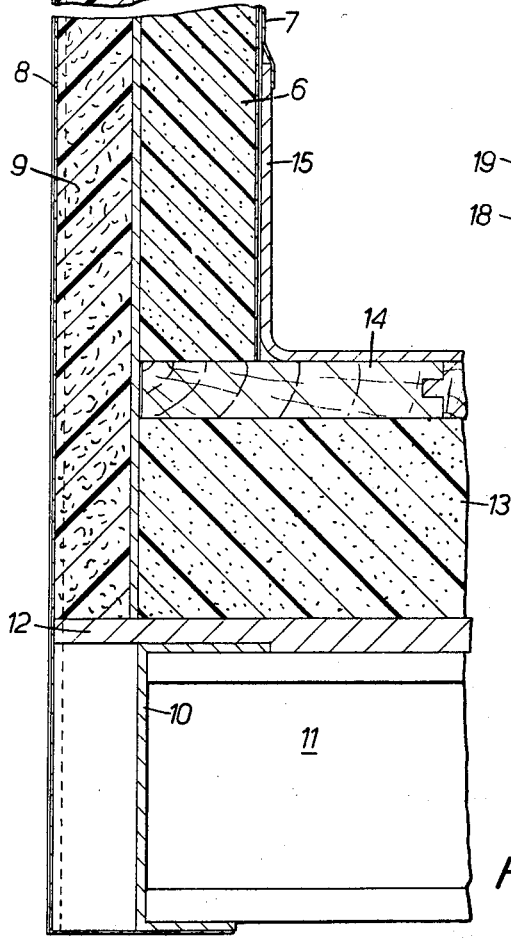
FIGURE 1 is a vertical section of the line I—I of FIGURE 2 through one wall and part of the roof and flooring of the vehicle body.
Figure 3:
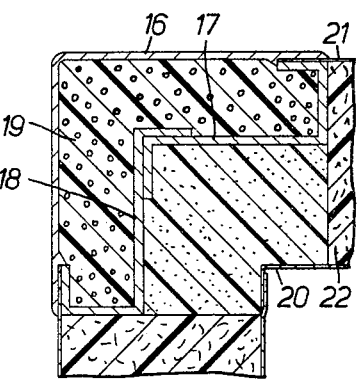
FIGURE 3 is a horizontal section through one corner of the body at the front closed end of the body below the roof.

The side walls and the front end wall of the vehicle body are joined by vertical pillars each composed of light alloy extruded angle sections 16, 17 and 18 jointed to form a closed hollow angle or corner pillar, as shown in FIGURE 3, and said hollow pillar is filled with a suitable heat insulating material 19, such as foamed polyurethane, whilst the space defined by the angle of the pillar is filled with for example expanded PVC. The front wall of the vehicle is covered internally and externally by sheet metal or plastics sheet panelling 20, 21 in the same manner as the side walls with a filling of slab polyurethane, or other high compression heat insulating material 22, therebetween. The edges of the roof of the vehicle body are attached to the top edges of the side and end walls by means of a horizontal extruded hollow section 23 of light alloy, which is filled with foamed polyurethane or other suitable heat insulating material, and mounted across the tops of the side pillar members 4 as shown in FIGURE 1. The roof is provided with horizontally spaced inner and outer transverse light alloy strengthening member 24 and with inner wall panelling 24a of relatively thin sheet metal alloy or plastics sheeting, the space between the inner and outer members 24 being filled with a high compression heat insulating material, such as expanded PVC, and the space between the inner member 24 and the wall panelling 24a being filled with a heat insulating material, such as polyurethane in slab form. The roof of the vehicle body may be constructed in the same manner as the side walls.

The rear of the body is of course provided with doors for giving access to the interior, the doors being constructed in a similar manner to the side walls.

The reason for using expanded PVC as a filling for the vertical pillars 4, 5, 6 is that such material has high compression strength. The parts of the side walls between the pillars do not need to be of the same strength as the pillars and therefore the filling used for these parts is preferably slab polyurethane which has higher heat insulating qualities. Foamed polyurethane can be used for filling the horizontal hollow sections 23 for the reason that such material can be easily sprayed or injected into said sections.

As above explained the vehicle body may be in the form of a container adapted to be removably supported on a vehicle chassis and in such a case the flooring of the container is made in the same manner as the side and end walls and the roof.

We claim:

1. A heat insulated body for commercial vehicles comprising a frame structure supporting heat insulating side walls, end walls, a roof and a flooring wherein the frame structure forms part of the side and end walls and comprises a plurality of spaced vertical pillars each formed from inner and outer frame elements, one of said elements defining a top hat shaped cross section and the other element having legs defining a channelled cross section, said legs facing a rim portion of the top hat shaped frame element to define a space between said frame elements, said space being filled with a heat insulating material of high compression strength bonded to said frame elements, and wherein the side walls comprise inner and outer wall panellings of relatively thin sheet material fitted between said vertical pillars with the space between said inner and outer wall panellings being filled with heat insulating material.

2. A heat insulated body for commercial vehicles comprising a frame structure supporting heat insulating side walls, end walls, a roof and a flooring, wherein the frame structure forms part of the side and end walls and comprises a plurality of spaced vertical pillars each formed from an outer frame element of top hat cross section and an inner frame element having legs defining a channelled cross section, said legs of the inner frame element facing a rim portion of the outer frame element to define a space between said outer and inner elements, said space being filled with expanded polyvinyl chloride bonded to said elements with a resin adhesive, and wherein the side walls comprise inner and outer wall panellings of relatively thin sheet material fitted between said vertical pillars with the space between said inner and outer wall panellings being filled with heat insulating material.

3. A heat insulated body for commercial vehicles according to claim 2, wherein the outer frame elements of top hat section are fixed directly to main channel section side beams which cap cross-bearers of the vehicle chassis, and a layer of heat insulating material is provided between a skin of aluminum alloy laid on said cross-bearers and the flooring of the vehicle body.

4. A heat insulated vehicle body according to claim 2, wherein the side and end walls are joined by vertical pillars composed of light alloy extruded angle section joined to form a hollow angle corner pillar.

5. A heat insulated vehicle body according to claim 2, wherein the side and end walls are joined by vertical pillars composed of light alloy extruded angle sections joined to form closed hollow angle section corner pillars and said hollow corner pillars are filled with foamed polyurethane and the space defined by the angle of said pillars is filled with expanded polyvinyl chloride.

6. A heat insulated vehicle body according to claim 2, wherein the roof is of the same construction as the side and end walls and the edges of the roof of the vehicle body are attached to the top edges of the side and end walls by horizontal extruded hollow sections of light alloy filled with foamed polyurethane.

7. A heat insulated vehicle body according to claim 2, wherein the flooring of the vehicle body consists of wooden boarding and an inner tray of aluminum supported on said wooden boarding.

8. A heat insulated vehicle body according to claim 2, wherein the body is formed as a separate container for removably mounting on a vehicle chassis and the flooring of said container is made in the same manner as the side and end walls and the roof.

9. A heat insulated vehicle body according to claim 2, wherein the roof is of the same construction as the side and end walls and the edges of the roof are attached to the top edges of the side and end walls by horizontal extruded hollow sections of light alloy filled with foamed polyurethane and the flooring of said body consists of wooden boarding and a tray of aluminum supported on said wooden boarding.

10. A heat insulated vehicle body according to claim 2, wherein the body is formed as a separate container adapted to be removably supported on the vehicle chassis and the flooring of said container is made in the same manner as the side and end walls.

11. A heat insulated body for commercial vehicles according to claim 2 wherein said heat insulating material filled between the inner and outer wall panellings is polyurethane.

References Cited

UNITED STATES PATENTS

| | | | |
|---|---|---|---|
| 2,612,028 | 9/1952 | Schnabel | 296—28 |
| 2,615,751 | 11/1952 | Black | 296—28 |
| 3,003,810 | 10/1961 | Kloote et al. | 296—28 X |
| 3,133,658 | 5/1964 | Freudman | 105—355 X |
| 3,163,434 | 12/1964 | Krueger | 296—28 X |
| 3,175,520 | 3/1965 | Talmey | 296—28 X |
| 3,331,174 | 7/1967 | Wesch et al. | 52—309 |
| 3,332,170 | 7/1967 | Bangs | 52—309 X |

LEO FRIAGLIA, Primary Examiner

J. A. PEKAR, Assistant Examiner

U.S. Cl. X.R.

52—309; 105—396, 409